Feb. 25, 1969   W. E. HIRTENSTEINER   3,429,348
APPARATUS FOR PULPING SEGMENTAL PRODUCE
Filed Aug. 29, 1966
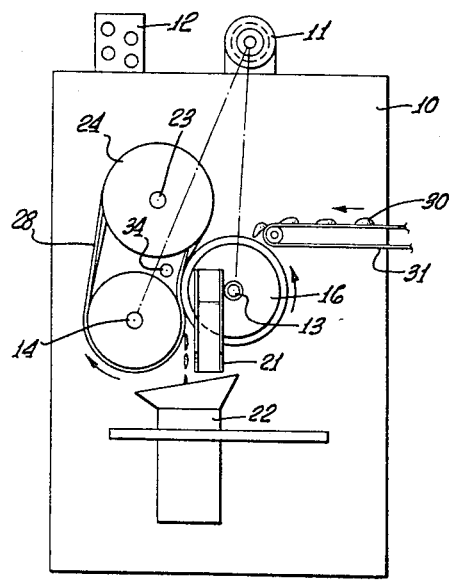
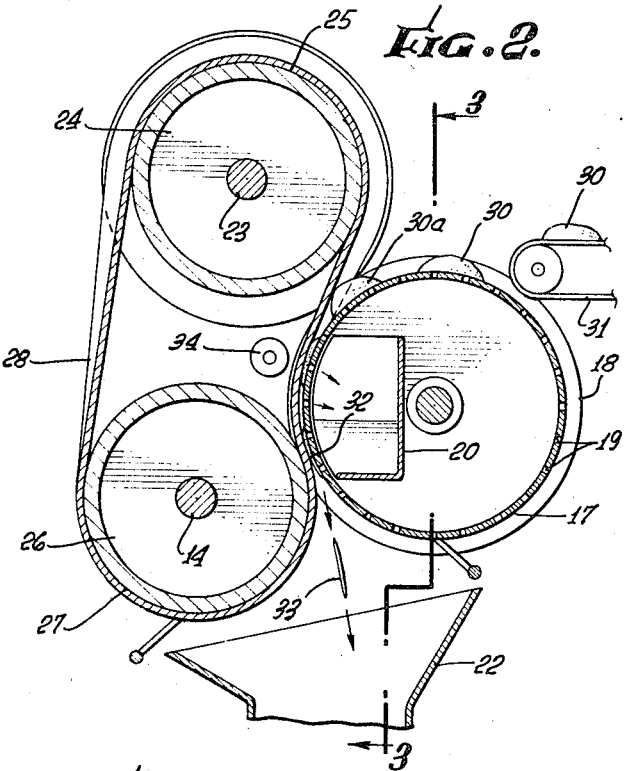
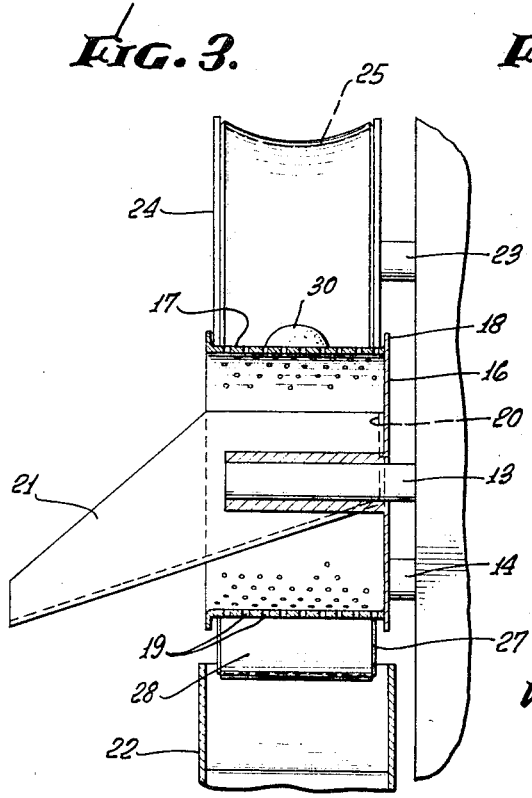
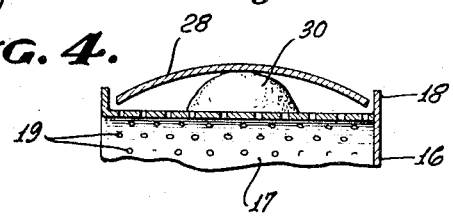
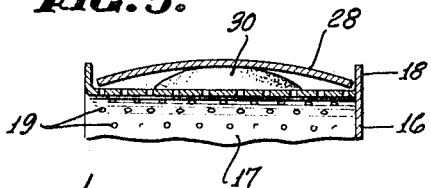
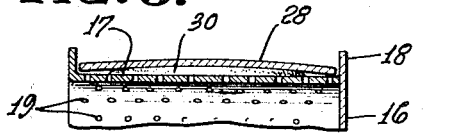
INVENTOR.
WALTER EARL HIRTENSTEINER.
By White & Haefliger
ATTORNEYS.

United States Patent Office 3,429,348
Patented Feb. 25, 1969

3,429,348
APPARATUS FOR PULPING SEGMENTAL PRODUCE
Walter Earl Hirtensteiner, 15051 Eastvale Road, Poway, Calif. 92064
Filed Aug. 29, 1966, Ser. No. 575,756
U.S. Cl. 146—76                4 Claims
Int. Cl. A47j 19/02; B30b 3/04, 9/20

ABSTRACT OF THE DISCLOSURE

The invention is directed to apparatus for the pulping or ricing of the meats of segmented fruit or vegetable produce, by passing the segments between a moving pressurizing belt and a rotating perforated drum, a section of the belt being concavely deflected to receive the segments for progressive forcing of their meats through the drum perforations and the belt then being progressively flattened to complete the meats separation from the segment skins which are expelled from between the drum and belt.

---

This invention has to do with improved methods and apparatus for pulping and separating from skins or the equivalent of fruit or vegetable produce, meats capable of conversion to essentially pulp consistency by passage through a perforated or medium as in the form of a ricer. As an illustrative adaptation, and one which has proven highly successful, the invention will be described with reference to the pulping of avocado meats and the separation of residual skins.

The invention has for its general object to provide method and apparatus operable to efficiently separate and pulp the meats of a continuous flow of sectioned pieces of produce, e.g. avocado, whereby the exposed meats are presented to and pressed through a perforated or ricing medium and the skins are progressively depleted of the meats to a high degree of separation of the latter for recovery as a pulp or paste useable typically in the case of avocados, as a food spread.

More specifically contemplated are method and apparatus whereby avocado sections with the seeds removed are fed between an endless moving ricing member and an endless pressurizing member moving in the same direction, the exposed avocado meat being presented to the ricer perforations through which the meat is progressively forced by the pressurizing member so that at the end of a course of advancement by and between the members, the residues will have become reduced essentially to the skins. This operation further contemplates advancing one of the endless members at a greater surface speed, the effect of the differential being to produce a shearing effect supplementing pressurizing of the segments to progressively separate the meats.

In its preferred form, the invention may utilize a ricer comprising a rotating perforated drum in surface opposition to a flexible belt driven in the same direction as the drum rotation, the belt having such progressively varying space relation from the drum surface as to present decreasing clearance that will assure expulsion of the meats through the drum perforations to a final skin residue. Particularly effective results have been gained by so transversely deflecting the belt as to present concavity at the point of fruit segment reception, and progressively relieving the concavity to a degree approaching substantially linear parallelism with the drum surface, thus to create continued pressurizing of the sections down to skin thickness.

The foregoing as well as various additional features and objects of the invention will be further understood from the following detailed description of an illustrative embodiment of the invention shown by the accompanying drawings in which:

FIG. 1 is a view showing in side elevation an illustrative mechanism for practice of the invention;

FIG. 2 is a fragmentary and enlarged sectional view showing the relation of the ricer drum and associated belt and pulley assembly;

FIG. 3 is a cross section taken on line 3—3 of FIG. 2; and

FIGS. 4, 5 and 6 are sectional views illustrative of the progressive belt deformation in relation to the ricer drum surface.

The equipment as generally indicated in FIG. 1 is shown to comprise a suitable housing 10 which mounts a motor 11 and control panel 12, the housing containing suitable mechanisms of conventional nature for transmitting the motor drive to a pair of shafts 13 and 14 projecting out of the side of the housing as illustrated in FIG. 3.

Shaft 13 carries and rotates a drum 16 having a perforated cylindrical shell 17 terminally flanged at 18 and having perforations 19 of such size, shape and distribution as to cause the avocado meats being forced through them, to reduce to pulp or paste consistency. As illustrative, the shell 17 is shown to be perforated to function essentially as a ricer. The interior of the shell contains a stationary receptacle 20 having a discharge trough or chute 21 extending out through the open end of the drum, the receptacle and trough assembly being supported by suitable means not shown. Directly beneath the inner side of the drum as viewed in FIG. 2 is positioned a receptacle 22 into which the fruit skins are discharged as will later appear.

A shaft 23 which may or may not be driven, carries a pulley 24 which as viewed in FIG. 3 has a transversely concave surface 25. Shaft 14 carries a second pulley 26 having a cylindrical surface 27. The pulleys carry an endless belt 28 which in passing about pulley 24 is concavely deflected in conformance with the pulley surface 25. Traveling clockwise with pulley 24 as viewed in FIG. 2, the belt engages and passes about the outer periphery of the perforated shell 17 and thence continues about the cylindrical surface 27 of pulley 26. As they appear in FIG. 1 the drum 16 is rotated counterclockwise and the pulley 26 clockwise and at somewhat slower speed so as to cause the shell 17 to slip forwardly, or in the direction of its travel, at a somewhat greater speed than the surface speed of the belt 28. This differential may be in the order of 25 to 30 percent. In traveling from surface 25 of the pulley 24 to engagement with the cylindrical surface 27 of pulley 26, the belt tends to progressively flatten as illustrated by the progressive showings of FIGS. 4, 5 and 6.

In operation, avocado halves 30 with the seeds removed are suitably fed as upon conveyor 31 onto the perforated shell 17 to be brought at 30a between the shell and the cupped belt 28. As the shell and belt advance downwardly in the same direction, the exposed meat sides or interiors of the sections 30 are pressed by the belt against the cylindrical ricer and in a manner such that the belt pressure is maintained with progressive increase, by virtue of the belt offset at 281 in relation to the drum, and the progressive belt change from concave to essentially flattened shape as it passes about the surface 27 of pulley 26. As a consequence the avocado meats are forced through the perforations 19 by continuing belt pressure that at the location 3 of closest opposition of the ricer shell and pulley 26, will have produced separation of the avocado meats to substantial completeness, leaving skin residues 33 which pass from between the belt and ricer into the receptacle 22. Progressive reduction of the avocado sections in passing from the initial size 30a and residual skin state are shown in FIGS. 4 to 6.

As previously indicated, the ricer and pulley 26 may be operated at differential speeds so that the somewhat faster traveling shell 17 tends to impart to the avocado meats a shearing action supplementing the belt pressure effect in assuring completeness of the separation. In any instance where a fruit section 30 may resist compaction to a degree that might cause excessive deflection of the belt 28 away from the ricer shell, such deflection may be limited as by a fixed idler roller 34 variably positionable in relation to the belt. The avocado meats extruded through the perforations 17 enter the receptacle 20 from which the paste-like product is recoverable out through the trough 21.

I claim:

1. Apparatus for pulping the exposed meat of fruit or vegetable produce segmented with attached skin, that includes an endless moving flexible pressurizing belt and an essentially cylindrical ricing drum having a perforated surface opposed to and moving in the same direction as the belt, means for feeding said segments between said belt and drum with the segment skins and meats engaged respectively by the belt and the perforated surface of the drum so that the meats are forced through the perforations and the skins are separately advanced and discharged from between the belt and drum, and means for deflecting a portion of the belt transversely concavely about the segments on the drum surface.

2. Apparatus according to claim 1, including means acting to flatten the belt toward the drum surface beyond said concave portion in the direction of the belt advancement.

3. Apparatus according to claim 2, in which said belt deflection means comprises a first drum having a concave belt carrying surface and said flattening means comprises a second drum having an essentially cylindrical belt carrying surface.

4. Apparatus according to claim 2, including means for advancing said belt and drum at differential speeds tending to shear the skins from the meats being forced through the drum perforations.

References Cited

UNITED STATES PATENTS

| | | | |
|---|---|---|---|
| 1,143,135 | 6/1915 | Rathbun | 146—5 X |
| 1,244,774 | 10/1917 | Pointe | 146—174 X |
| 2,846,944 | 8/1958 | Willmes et al. | |
| 3,057,387 | 10/1962 | Hyde et al. | 146—174 X |

W. GRAYDON ABERCROMBIE, *Primary Examiner.*

U.S. Cl. X.R.

100—153; 146—174